United States Patent
Noda et al.

(10) Patent No.: US 6,837,211 B2
(45) Date of Patent: Jan. 4, 2005

(54) STRATIFIED AIR-FUEL MIXTURE FORMING APPARATUS FOR INTERNAL COMBUSTION ENGINE AND METHOD THEREOF

(75) Inventors: Toru Noda, Yokohama (JP); Isamu Hotta, Yokohama (JP); Yasunori Iwakiri, Yokohama (JP); Akihiko Kakuho, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/800,633

(22) Filed: Mar. 16, 2004

(65) Prior Publication Data

US 2004/0173179 A1 Sep. 9, 2004

Related U.S. Application Data

(63) Continuation of application No. PCT/JP02/08301, filed on Aug. 15, 2002.

(30) Foreign Application Priority Data

Sep. 17, 2001 (JP) .......................................... 2001-281634

(51) Int. Cl.$^7$ ................................................ F02B 17/00
(52) U.S. Cl. .......................... 123/295; 123/305; 123/531
(58) Field of Search .................................. 123/295, 305, 123/531, 532, 533, 458

(56) References Cited

U.S. PATENT DOCUMENTS

| | | | | | |
|---|---|---|---|---|---|
| 5,921,215 A | * | 7/1999 | Wirth et al. | ................. | 123/298 |
| 5,979,399 A | * | 11/1999 | Piock et al. | ................. | 123/301 |
| 6,047,592 A | * | 4/2000 | Wirth et al. | ................... | 73/116 |
| 6,725,828 B1 | * | 4/2004 | Han et al. | .................... | 123/295 |

FOREIGN PATENT DOCUMENTS

| | | |
|---|---|---|
| JP | 1-166271 U | 11/1989 |
| JP | 3-3935 A | 1/1991 |
| JP | 5-86948 A | 4/1993 |
| JP | 11-082028 A | 3/1999 |

* cited by examiner

*Primary Examiner*—John T. Kwon
(74) *Attorney, Agent, or Firm*—Foley & Lardner LLP

(57) ABSTRACT

In the present invention, in a direct-injection spark ignition internal combustion engine, an air-fuel mixture mass of appropriate density and size is formed in a combustion chamber having a piston bowl with fixed volume, according to an operating condition of the engine. For this purpose, a fuel injection amount is increased according to a rise of an engine load, the momentum of a fuel spray in the axial direction of a cylinder is increased, and also an increase rate of the momentum of a fuel spray in an axial direction of a cylinder is made greater than that of the fuel injection amount.

15 Claims, 10 Drawing Sheets

AT LOW LOAD

AT HIGH LOAD

STRATIFIED AIR-FUEL MIXTURE FORMING APPARATUS FOR INTERNAL COMBUSTION ENGINE AND METHOD THEREOF

This application is a continuing application, filed under 35 U.S.C. § 111 (a), of International application PCT/JP/02/08301, filed Aug. 15, 2002, which International Application, in turn, claims priority benefit based upon Japanese Patent Application No. 2001-281634, filed Sep. 17, 2001, the contents of which are incorporated by reference.

TECHNICAL FIELD

The present invention relates to an internal combustion engine in which fuel is directly injected into a cylinder to be burned by spark ignition.

BACKGROUND ART

There is an internal combustion engine in which fuel is injected from an upper portion of a combustion chamber toward a cavity formed in a top surface of a piston to form a stratified air-fuel mixture in the cavity and in a space above the cavity, and the stratified air-fuel mixture is burned by spark ignition as disclosed in Japanese Unexamined Patent Publication No. 11-82028.

DISCLOSURE OF THE INVENTION

Since a range in which a stratified air-fuel mixture is formed (the size of an air-fuel mixture mass) is mainly determined depending on the size of a cavity, an air-fuel ratio of the air-fuel mixture becomes lean when an engine load is low (a fuel injection amount is small) while the air-fuel ratio of the air-fuel mixture becomes rich when the engine load is high (the fuel injection amount is large). In other words, since a range of the load condition under which the air-fuel mixture of an appropriate air-fuel ratio (in the vicinity of a stoichiometric air-fuel ratio) can be formed is determined depending on the size of the cavity, it is difficult to carry out stratified combustion operation under a wide load condition.

The present invention has been accomplished in view of the above problem and it is an object of the invention to provide a stratified air-fuel mixture forming apparatus and a method thereof, capable of forming a stratified air-fuel mixture of an appropriate air-fuel ratio under a broad load condition.

For this object, in the present invention, a stratified air-fuel mixture forming apparatus for an internal combustion engine in which a spark plug is disposed substantially at the center of an upper portion of a combustion chamber, comprises a fuel injecting device which forms a fuel spray moving toward a piston reciprocating in a cylinder, and a control device which controls the momentum of the fuel spray according to a fuel injection amount so that an increase rate of the momentum of the fuel spray in an axial direction of the cylinder is greater than that of the fuel injection amount.

With such a constitution, a range in which the stratified air-fuel mixture is formed can be widened positively as the fuel injection amount (engine load) increases. As a result, it is possible to form the air-fuel mixture of the appropriate air-fuel ratio under the broad load condition.

Characteristic structures and operation and effects based on them of the present invention will become more apparent by the following embodiments.

BEST MODE FOR CARRYING OUT THE INVENTION

Embodiments of the present invention will be described below based on the drawings.

Figure 1:
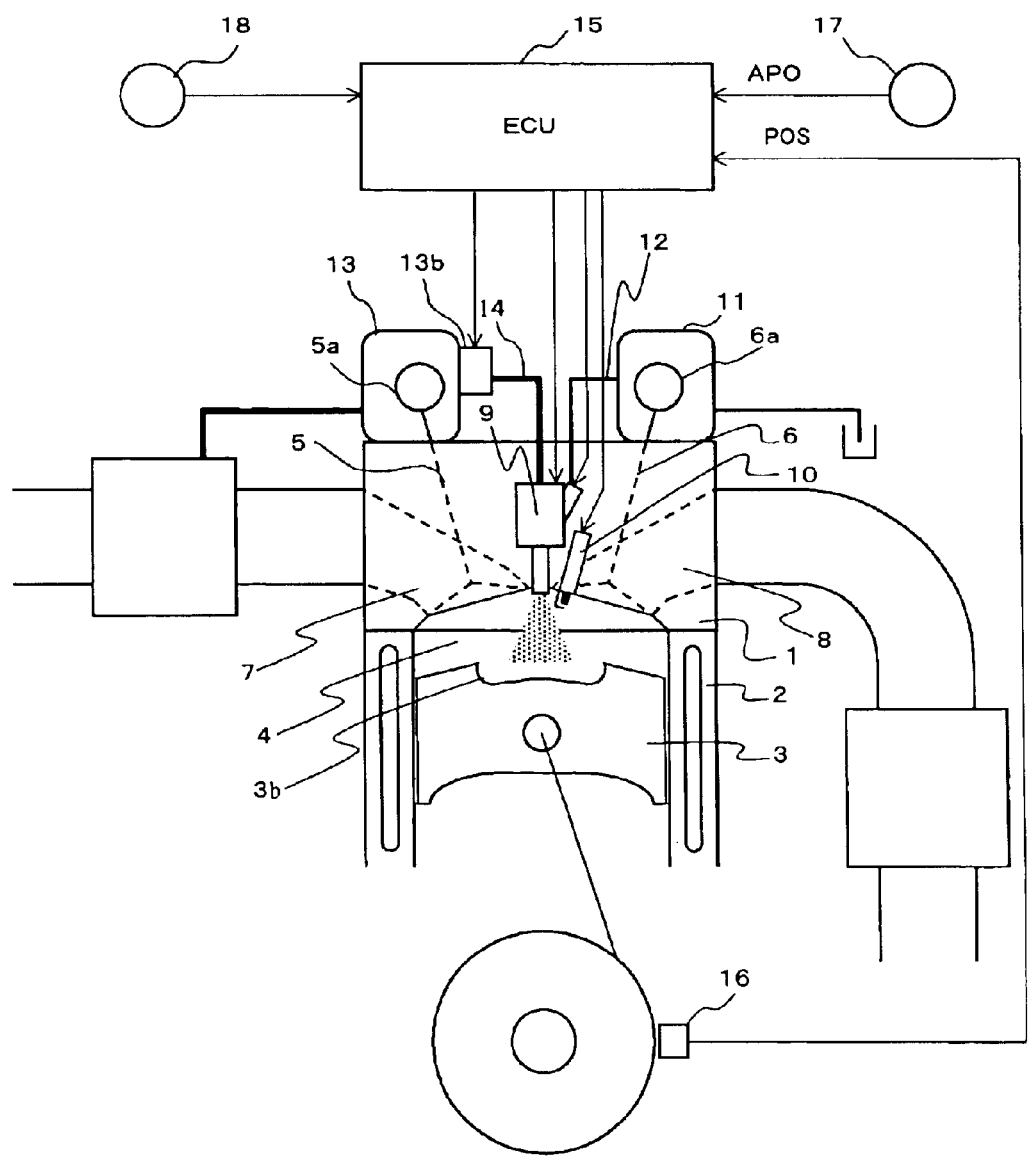
FIG. 1 is a system diagram of a first embodiment of the present invention.

FIG. 1 is a system diagram showing a constitution of a first embodiment of a direct-injection spark ignition internal combustion engine according to the present invention.

This internal combustion engine includes a combustion chamber 4 defined by a cylinder head 1, a cylinder block 2, and a piston 3, and takes in fresh air from an intake port 7 through an intake valve 5 and discharges exhaust from an exhaust port 8 through an exhaust valve 6.

An air-fuel mixture injection valve (fuel injecting device) 9, which is disposed substantially at the center of an upper portion of the combustion chamber 4, can inject a mixture of air and fuel in the form of a spray symmetric with respect to a cylinder axis, toward the piston 3. A bowl portion 3b is formed on a portion, which faces the air-fuel mixture injection valve 9, of the piston 3. The injected air-fuel mixture is form in a stratified air-fuel mixture mass mainly in and above the bowl portion 3b. The air-fuel mixture mass is ignited and burned by a spark plug 10 disposed substantially at the center of the upper portion of the combustion chamber 4.

A fuel injection system will be described in detail.

At an end portion of a camshaft 6a driving the exhaust valve 6, a fuel pump 11 driven by the camshaft 6a is disposed. The fuel pump 11 pumps the fuel out of a fuel tank, to supply the fuel to the air-fuel mixture injection valve 9 through fuel piping 12. A fuel pressure in the fuel piping 12 is always maintained at a constant pressure.

On the other hand, at an end portion of a camshaft 5a driving the intake valve 5, an air pump 13 driven by the camshaft 5a is disposed. The air pump 13 pumps the air out of an intake collector, to supply the air to the air-fuel mixture injection valve 9 through air piping 14. An air pressure in the air piping 14 can be regulated to an arbitrary pressure by a pressure control valve (gas pressure regulator) 13b.

Here, the two pumps may be driven by one of the camshafts or may be driven by an electric motor disposed separately.

Figure 2:
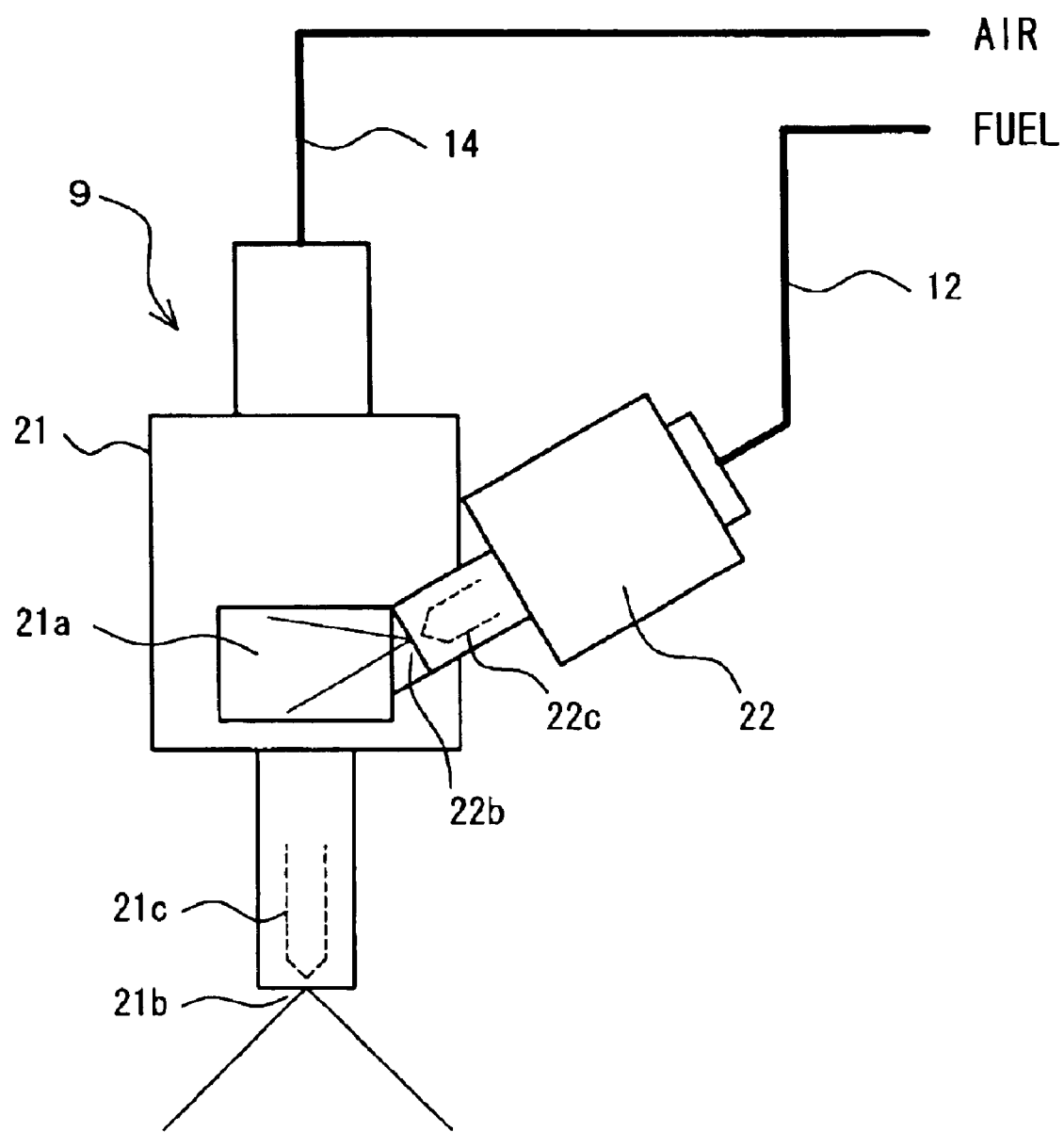
FIG. 2 is a schematic structural diagram of an air-fuel mixture injection valve.

The air-fuel mixture injection valve 9, as shown in a schematic structural diagram of FIG. 2, consists of a main injector (gas injection valve) 21 facing inside the combustion chamber 4 and a subsidiary injector 22 facing an air-fuel mixture chamber 21a of the main injector 21.

In other words, the air-fuel mixture chamber 21a, to which the air piping 14 is connected, is in the main injector 21 being a main body of the air-fuel mixture injection valve 9. The air-fuel mixture chamber 21a is connected to a nozzle hole 21b, which faces inside the combustion chamber, of the main injector 21. The nozzle hole 21b is opened and closed by an electro-magnetically driven needle valve 21c.

The fuel piping 12 is connected to the subsidiary injector 22 and a nozzle hole 22b of the subsidiary injector 22 faces the air-fuel mixture chamber 21a of the main injector 21. The nozzle hole 22b is opened and closed by an electro-magnetically driven needle valve 22c.

Accordingly, the air pressurized by the air pump 13 is led into the air-fuel mixture chamber 21a of the main injector 21. When the needle valve 22c of the subsidiary injector 22 is driven to open, the fuel pressurized by the fuel pump 11 is injected into the air-fuel mixture chamber 21a, and the injected fuel is mixed with the high-pressure air in the air-fuel mixture chamber 21a, to form an air-fuel mixture. The air-fuel mixture is injected into the combustion chamber 4 when the needle valve 21c of the main injector 21 is driven to open.

In the present embodiment, since the constitution is such that the fuel and air are injected into the combustion chamber by means of one air-fuel mixture injection valve, the structure of the fuel injecting device is relatively simple, resulting in that the designing around the combustion chamber is easy. However, the present invention can also be realized in such a fuel injecting device in which a fuel injection system and an air injection system are independent of each other, and fuel and air are separately injected into a combustion chamber (with two nozzle holes formed adjacent to each other). Moreover, it is also possible to realize the present invention by disposing an injection valve injecting fuel only and an injection valve injecting air only adjacent to each other.

Next, a control system of the present embodiment will be described.

This internal combustion engine is controlled in an integrated manner by an engine control unit (hereinafter referred to as ECU) 15 being a control device. For this purpose, the ECU 15 receives signals from a crank angle sensor 16 outputting a signal at each time a crankshaft is rotated by a predetermined angle (for example, 1°), an accelerator opening sensor 17 outputting a signal corresponding to a depression amount of an accelerator pedal, a water temperature sensor 18 outputting a signal corresponding to a temperature of engine cooling water and the like. The ECU 15 performs necessary operations and processing therein, to control the air-fuel mixture injection valve 9, the spark plug 10, the pressure control valve 13b and the like. At this time, the needle valve 22c of the subsidiary injector 22 and the needle valve 21c of the main injector 21 can be controlled independently in the air-fuel mixture injection valve 9.

Figure 3:
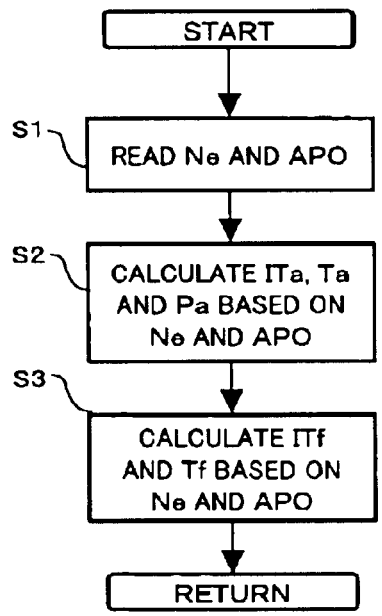
FIG. 3 is a flowchart showing a routine of control.

FIG. 3 is a control flowchart showing a processing routine executed by the ECU 15 at each predetermined time (for example, 10 ms). In this routine, control values for controlling the air-fuel mixture injection valve 9 and the pressure control valve 13b are calculated.

First, at step 1 (S1 in the drawing and succeeding steps are abbreviated similarly), an engine rotational speed Ne and an accelerator opening APO are read from a memory in the ECU 15. The ECU 15 calculates the engine rotational speed Ne sequentially based on the signals from the crank angle sensor 16, and the latest value is stored in the memory in the ECU 15. Output signals (APO) from the accelerator opening sensor 17 are sampled in a predetermined cycle, and the latest value is stored in the memory in the ECU 15. The accelerator opening APO is a parameter representing an engine load.

Figure 4:
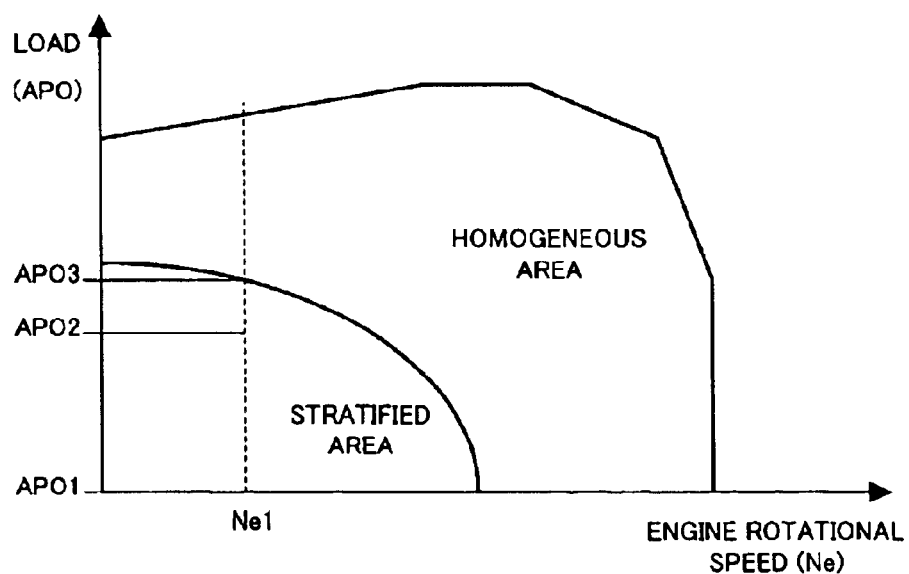
FIG. 4 is a diagram showing the switching of combustion modes with respect to rotation and a load.

Next, at step 2, injection timing ITa and opening time Ta of the main injector 21, and a target air pressure Pa of the pressure control valve 13b, are calculated based on the engine rotational speed Ne and the accelerator opening APO. To be specific, respective values corresponding to the current Ne and APO are looked up in a control map in which ITa, Ta, and Pa are stored so as to correspond to the engine rotational speed and the accelerator opening. As shown in FIG. 4, in the present embodiment, a stratified combustion is performed in a low-rotation and low-load area and a homogeneous combustion is performed in an area other than the low-rotation and low-load area. Therefore, the injection timing ITa for when engine operating conditions (Ne, APO) are in the stratified combustion area, is set in the latter half of a compression stroke, and the injection timing ITa for when the engine operating conditions are in the homogeneous combustion area, is set in an intake stroke. Furthermore, the injection timing ITa in the stratified combustion area is set to an advance side as the engine load (accelerator opening APO) increases.

Next, at step 3, injection timing ITf and opening time Tf of the subsidiary injector 22 are calculated based on the engine rotational speed Ne and the accelerator opening APO. To be specific, respective values corresponding to the current Ne and APO are looked up in a control map in which ITf and Tf are stored so as to correspond to the engine rotational speed and the accelerator opening. Here, the injection timing ITf of the subsidiary injector 22 is set to a slightly further advance side than the injection timing ITa of the main injector 21.

The respective control values calculated as described above are once stored in the memory in the ECU 15, and then used to control the air-fuel mixture injection valve 9 and the pressure control valve 13b. To be specific, at a crank angle corresponding to the injection timing ITf, a valve opening signal of pulse width corresponding to the opening time Tf is sent to the subsidiary injector 22 of the air-fuel mixture injection valve 9, and at a crank angle corresponding to the injection timing ITa, a valve opening signal of pulse width corresponding to the opening time Ta is sent to the main injector 21 of the air-fuel mixture injection valve 9, and a control signal for coinciding the air pressure in the air piping 14 with the target air pressure Pa is sent to the pressure control valve 13b.

Next, setting characteristics of the respective control values calculated in the routine of FIG. 3 and a spray characteristic due to the setting characteristics will be described referring to FIG. 5. The respective control values and the spray characteristic under a condition that the engine rotational speed is constant (Ne1 in FIG. 4) are shown in FIG. 5.

Figure 5:
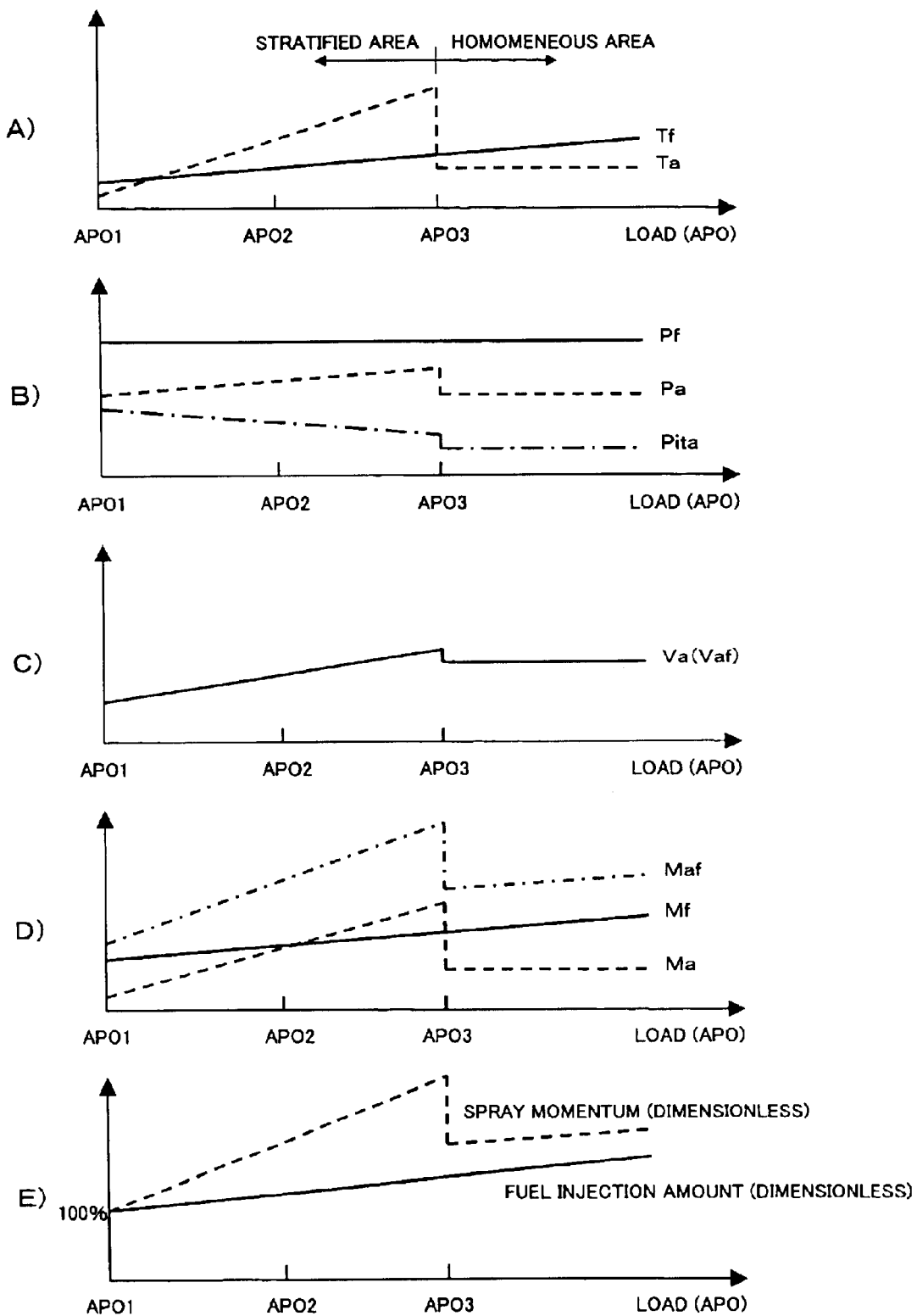
FIG. 5 is a diagram showing setting characteristics of control values and a spray characteristic.
Figure 6:
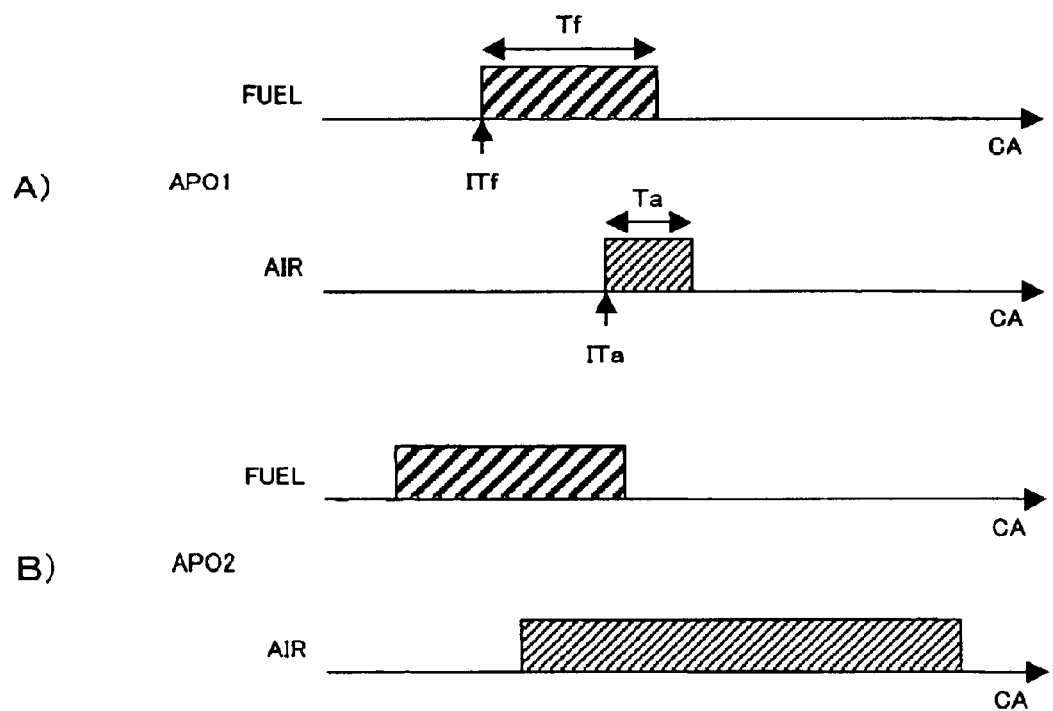
FIG. 6 is a time chart of fuel and air injection.

A) of FIG. 5 shows the settings of the opening time Ta of the main injector 21 and the opening time Tf of the subsidiary injector 22. The opening time Tf of the subsidiary injector 22 is set to increase as the load increases. The opening time Ta of the main injector 21 is set to increase as the load increases in the stratified area, while being set to a relatively short and constant time irrespective of the load in the homogeneous area. An increase rate of the opening time Ta of the main injector 21 in the stratified area is greater than that of the opening time Tf of the subsidiary injector 22, and therefore, a ratio of the opening time Ta to the opening time Tf increases as the load increases. A) of FIG. 6 shows operation time charts of the main and subsidiary injectors 21 and 22 at the lowest load (APO1), and B) of FIG. 6 shows operation time charts of the main and subsidiary injectors 21 and 22 at the medium load (APO2) in the stratified area, respectively.

B) of FIG. 5 shows a fuel pressure Pf in the fuel piping 12, an air pressure Pa in the air piping 14, and a pressure Pit in the combustion chamber 4 at the injection timing ITa of the main injector 21. The fuel pressure Pf is always maintained at a constant pressure. The air pressure Pa is set to increase as the load increases in the stratified area, while being set to a relatively low and constant pressure irrespective of the load in the homogeneous area. Further, the injection timing ITa of the main injector 21 is set in the latter half of the compression stroke and to the advance side as the load increases in the stratified area, and is set in the intake stroke in the homogeneous area. Therefore, the pressure Pita in the combustion chamber at the injection timing ITa decreases as the load increases in the stratified area, and is constant (in the vicinity of atmospheric pressure) irrespective of the load in the homogeneous area.

C) of FIG. 5 shows a spray velocity Vaf at the injection timing ITa of the main injector 21. In the present embodiment, a velocity Va of the air injected from the main injector 21 is the spray velocity Vaf, and the injected air velocity Va increases as a difference between the air pressure Pa and the pressure Pita in the combustion chamber increases. Accordingly, the spray velocity Vaf increases as the load increases in the stratified area, while being substantially constant in the homogeneous area.

D) of FIG. 5 shows a fuel injection amount Mf, an air injection amount Ma, and a total amount Maf of the injected air and fuel. The fuel injection amount Mf is determined based on the fuel pressure Pf and the opening time Tf of the subsidiary injector 22. Consequently, the fuel injection amount Mf increases as the load increases. Further, the air injection amount Ma is determined based on the injected air velocity Va and the opening time Ta of the main injector 21. Consequently, the air injection amount Ma increases as the load increases in the stratified area, while being substantially constant in the homogeneous area. An increase rate of the air injection amount Ma is greater than that of the fuel injection amount Mf in the stratified area, and therefore, a ratio of the air injection amount Ma to the fuel injection amount Mf increases as the load increases.

E) of FIG. 5 shows the spray momentum and the fuel injection amount. The spray momentum is determined based on the spray velocity Vaf and the air-fuel total injection amount Maf. Accordingly, the spray momentum considerably increases as the load increases in the stratified area, while slightly increasing as the load increases in the homogeneous area. Here, the spray momentum in this figure is a dimensionless value (=spray momentum/minimum spray momentum) obtained by using the minimum spray momentum (spray momentum at APO1), and the fuel injection amount is similarly a dimensionless value (=fuel injection amount Mf/minimum fuel injection amount) obtained by using the minimum fuel injection amount (fuel injection amount at APO1). As is apparent from figure, an increase rate of the spray momentum is greater than that of the fuel injection amount in the stratified area. Since a spray injecting direction or a shape of the spray does not change in this embodiment, an increase rate of the momentum of the whole spray and an increase rate of the spray momentum in an axial direction of the cylinder are substantially equal to each other. Accordingly, the increase rate of the spray momentum in the axial direction of the cylinder is greater than that of the fuel injection amount. To specifically describe the case in this figure, the spray momentum increases up to about twice the minimum spray momentum under the load condition (APO2) that the fuel injection amount increases by about 25% from the minimum fuel injection amount.

Figure 7:
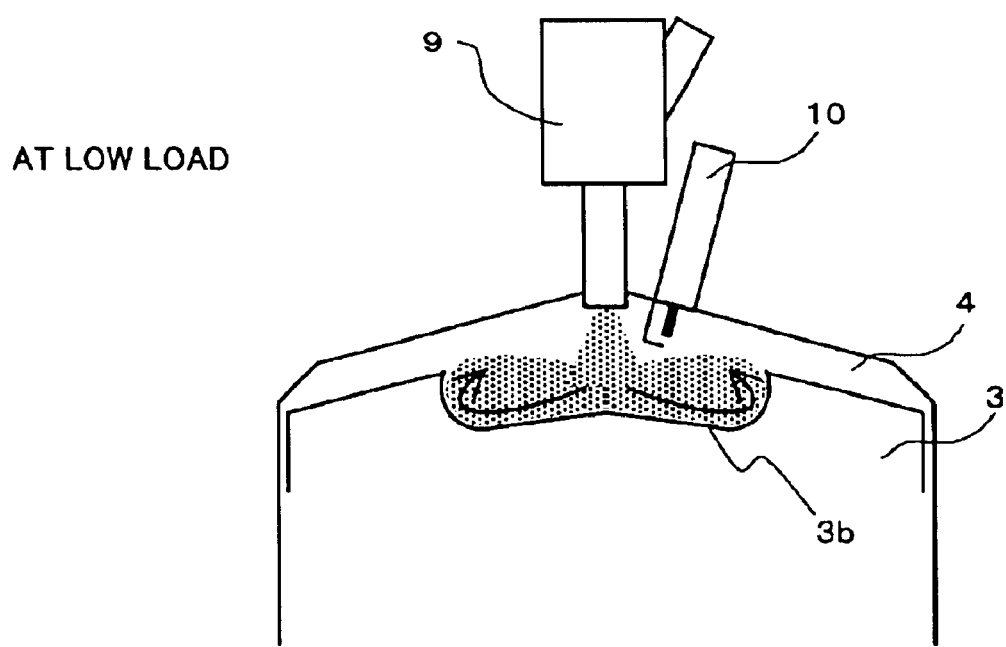
FIG. 7 is a diagram showing a process of forming an air-fuel mixture in a cylinder.
Figure 7:
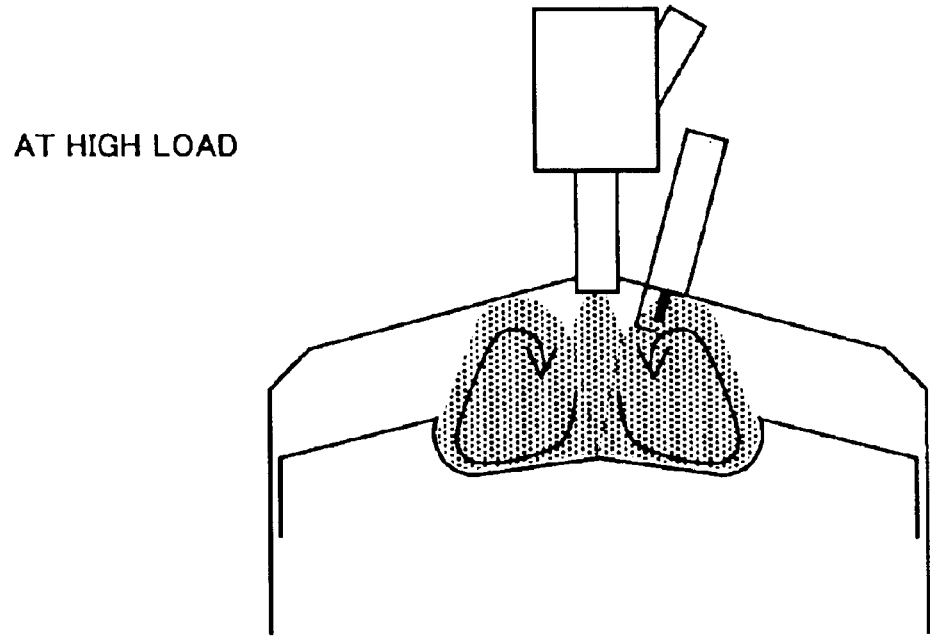

FIG. 7 schematically shows a process of forming the stratified air-fuel mixture in the combustion chamber in the present embodiment.

Since the spray momentum in the axial direction of the cylinder is small at the low load with a small fuel injection amount, the spray injected from the air-fuel mixture injection valve 9 toward the bowl portion 3b on the top surface of the piston 3 remains in the bowl portion 3b, to be diffused and mixed in the bowl portion 3b. Therefore, the size of the stratified air-fuel mixture mass becomes relatively small and the air-fuel ratio of the air-fuel mixture can be maintained in a desired range even if the fuel injection amount is small.

Since the spray momentum in the axial direction of the cylinder is large at the high load with a large fuel injection amount, the spray injected from the air-fuel mixture injection valve 9 toward the bowl portion 3b on the top face of the piston 3 collides with an inner wall of the bowl portion 3b, then rolls up by a large amount due to its momentum, and is diffused and mixed while mixing up the air above the bowl portion 3b. As a result, the size of the stratified air-fuel mixture mass becomes relatively large and the air-fuel ratio of the air-fuel mixture can be maintained in the desired range even if the fuel injection amount is large.

As described above, by controlling the spray momentum in the axial direction of the cylinder according to the load, it is possible to form the stratified air-fuel mixture mass of the appropriate size under the broad load condition.

Especially, according to the embodiment, since the fuel injecting device (air-fuel mixture injection valve 9) includes the gas injection valve (main injector 21) injecting gas toward the piston, and is configured to form the injected gas (air) and the fuel into the fuel spray, the spray momentum in the axial direction of the cylinder can reliably be controlled according to the load by controlling the gas injection amount (the opening time Ta) and also the gas pressure (the air pressure Pa), while enabling the control of the spray momentum in the axial direction of the cylinder by only controlling the gas.

Although the increase rate of the opening time Ta of the main injector 21 is greater than that (=increase rate of the fuel injection amount) of the opening time Tf of the subsidiary injector 22 in this embodiment, such setting is not necessarily to be performed. In other words, even if the increase rate of the opening time Ta is small, the increase rate of the spray momentum can be made greater than that of the fuel injection amount if the increase rate of the air pressure Pa is increased. In an extreme case, it is also possible set the opening time Ta of the main injector 21 to be constant irrespective of the load, and to increase only the air pressure Pa according to the rise of the load. In this case, however, the air pressure Pa needs to be significantly changed, and therefore, the air pump 13 and the pressure control valve 13b with high performance are accordingly required.

It is also possible to set the air pressure Pa to be constant irrespective of the load and to increase the opening time Ta of the main injector 21 according to the rise of the load, to thereby make the increase rate of the spray momentum greater than that of the fuel injection amount. In this case, the pressure control valve 13b can be omitted. However, in this case, it is essential to make the increase rate of the opening time Ta greater than that of the fuel injection amount. Moreover, when the spray momentum is made to sufficiently increase only by increasing the opening time Ta, the opening time Ta at the high load becomes extremely long. Therefore, it becomes necessary to advance largely the injection timing ITa of the main injector 21 at the high load, resulting in that it is difficult to form the stratified air-fuel mixture mass in the bowl portion 3b of the piston 3. Consequently, a preferable stratified combustion can be obtained under the broader engine operating condition if the air pressure Pa is also increased.

Since the air injection amount Ma in the homogeneous area is relatively small in the present embodiment, it is possible to reduce energy consumption in actuation of the air pump 13. Although the air injection amount Ma in the homogeneous area is constant irrespective of the load in this embodiment, the air injection amount Ma may be set so that a ratio between the air injection amount Ma and the fuel injection amount Mf becomes constant, for example, to maintain the air-fuel ratio of the spray in the homogeneous to be substantially constant.

Although the air is used as the gas to be injected with the fuel in the present embodiment, similar effects can be obtained with other gases such as burned gas of the engine itself, so-called an EGR gas or the like Next, the setting of the spray momentum relative to the engine rotational speed will be described.

In a typical internal combustion engine, the higher the engine rotational speed, the stronger a flow (turbulence) of gas in the combustion chamber becomes. Accordingly, the higher the engine rotational speed, the spray is likely to be diffused. Therefore, the spray momentum is set to increase as the engine rotational speed increases under the same load condition, to thereby prevent excessive diffusion of the spray during the operation at a high rotational speed.

In an engine in which the displacement is large and a range of rotational speed is on a low-speed side as a whole or an engine in which a bore/stroke ratio is extremely large, the gas flow may not develop to the extent of exerting a large influence on diffusion of the spray in some cases. In such an engine, it is also possible to increase the spray momentum as the engine rotational speed increases.

Next, a second embodiment of the present invention will be described.

Figure 8:
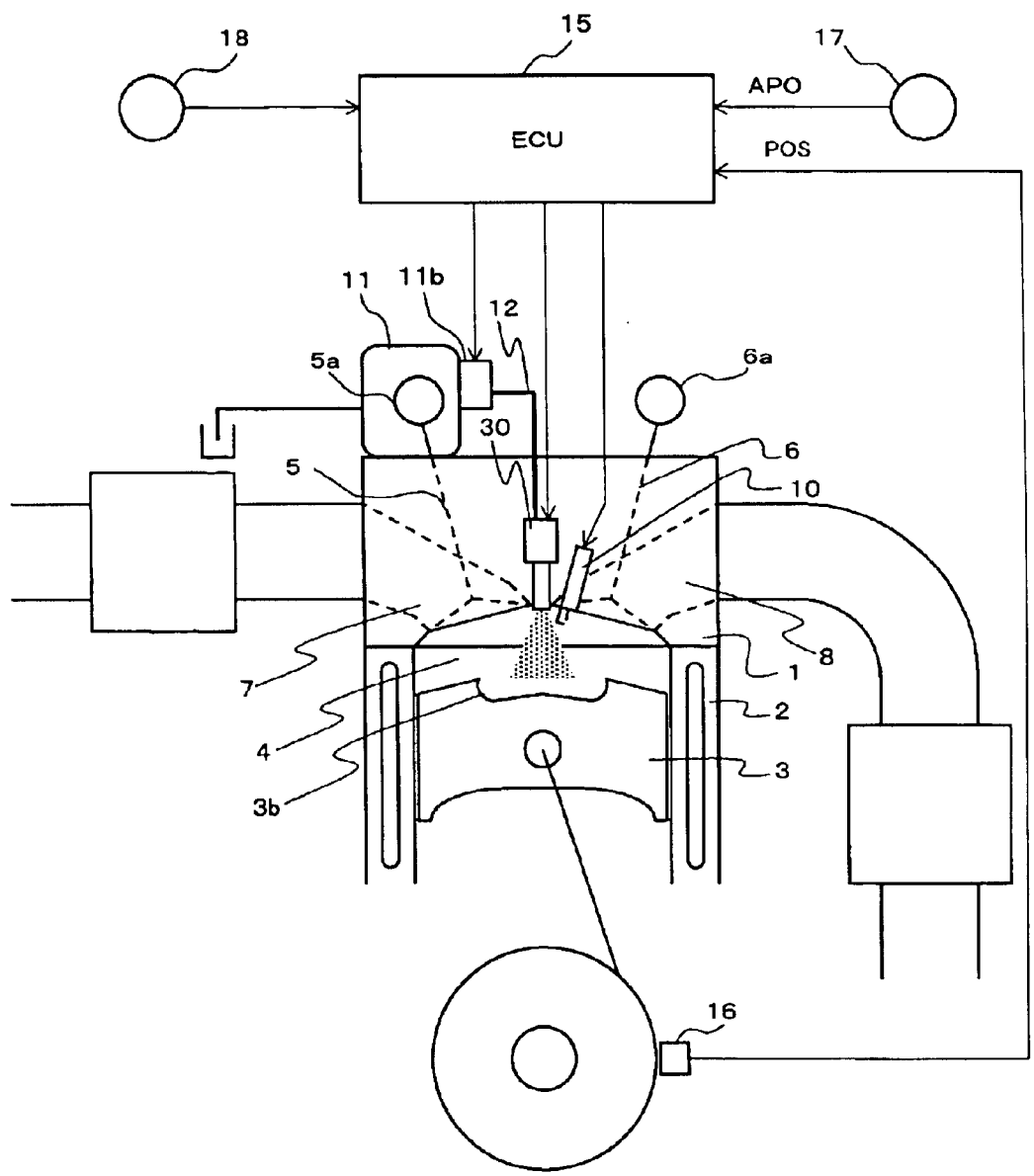
FIG. 8 is a system diagram of a second embodiment of the invention.

FIG. 8 is a system diagram showing a constitution of the second embodiment. In the present embodiment, an injector (fuel injection valve) 30 singly injecting fuel is used as a fuel injecting device. Therefore, the system does not include the air pump as in the first embodiment. The constitution of the second embodiment differs from that of the first embodiment in that the fuel pump 11 is disposed at an end portion of the camshaft 5a driving the intake valve 5 and a fuel pressure control valve (fuel pressure regulator) 11b capable of regulating the fuel pressure in the fuel piping 12 to an arbitrary pressure is provided.

Figure 9:
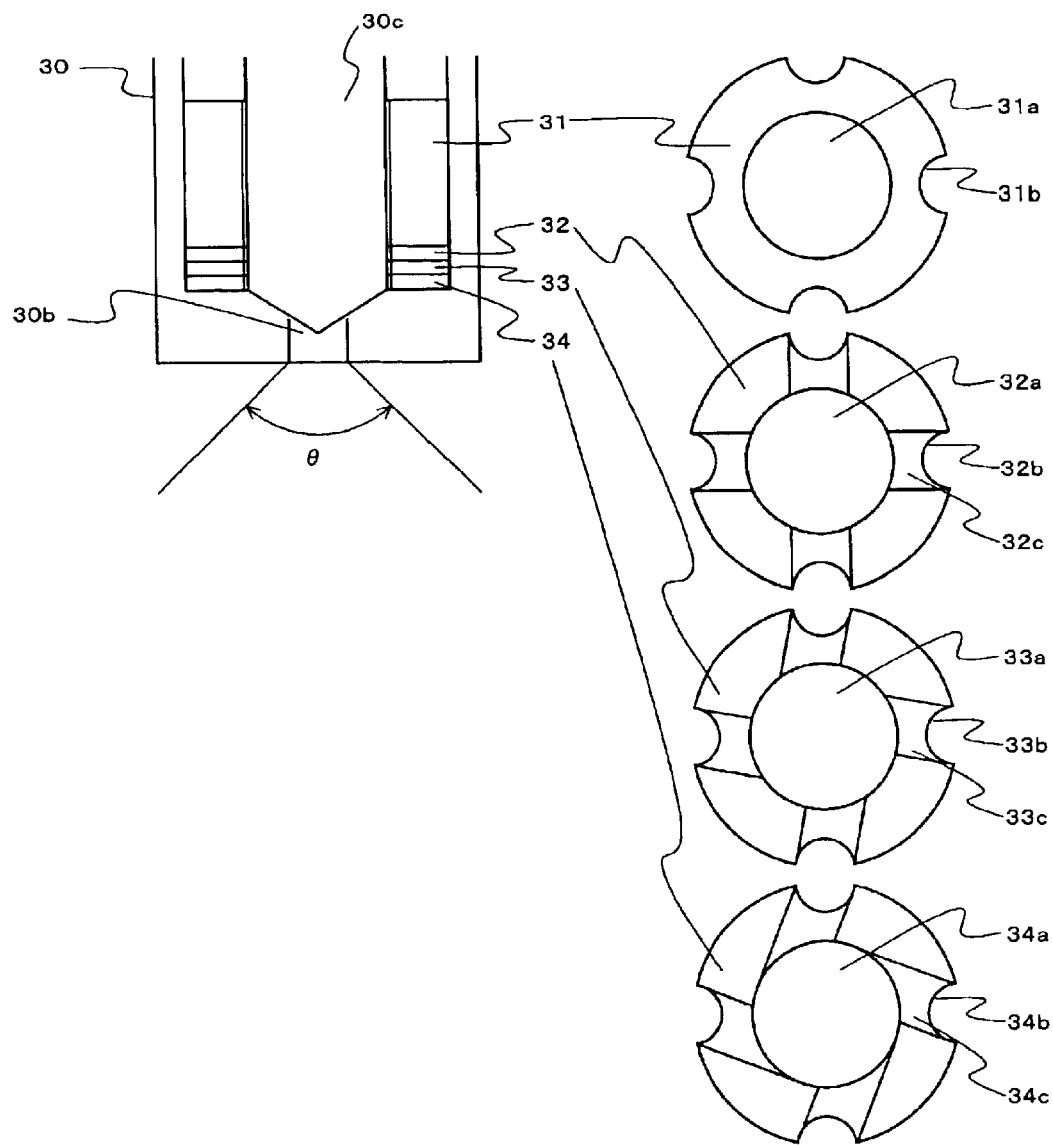
FIG. 9 is a schematic structural diagram of an injector.

The injector 30 is a swirl injector in which swirl chips are disposed around a needle valve 30c opening and closing a nozzle hole 30b as shown in a schematic structural diagram in FIG. 9. The swirl chips of the injector 30 consist of four parts 31 to 34.

The part 31 on the most upstream side is a cylindrical part which is provided with a hole 31a of a slightly larger diameter than a diameter of the needle valve 30c on a center thereof, and axially extending four fuel passage grooves 31b on an outer peripheral face thereof. The part 32 adjacent to the part 31 is a disc-shaped part which is provided with a hole 32a similar to the part 31 and fuel passage grooves 32b communicating with the fuel passage grooves 31b of the part 31. Radial fuel passage grooves 32c connecting the hole 32a to the fuel passage grooves 32b are formed on an end face of the part 32. The part 33 adjacent to the part 32 is similar to the part 32. However, each of radial fuel passage grooves 33b of the part 33 is formed so as to be at a predetermined angle to the radial direction. The part 34 closest to a tip end is also similar to the part 32 or the part 33. However, angles at which radial fuel passage grooves 34b of the part 34 are formed are greater than those of the radial fuel passage grooves 33b of the part 33.

With the above structure of the swirl chips 31 to 34, it is possible to change the strength of a swirl generated in the nozzle hole 30b by changing a lift amount of the needle valve 30c in the injector 30. As a result, it is possible to change a spray angle θ of a hollow conical spray. The needle valve 30c is driven by a piezo actuator and controls magnitude (voltage) of the valve opening signal, to thereby achieve an arbitrary lift amount. If an electromagnetic coil actuator is used, one valve opening signal can be split into a plurality of small pulses to be sent to the actuator, and the lift amount can be regulated by controlling the width of each small pulse.

Figure 10:
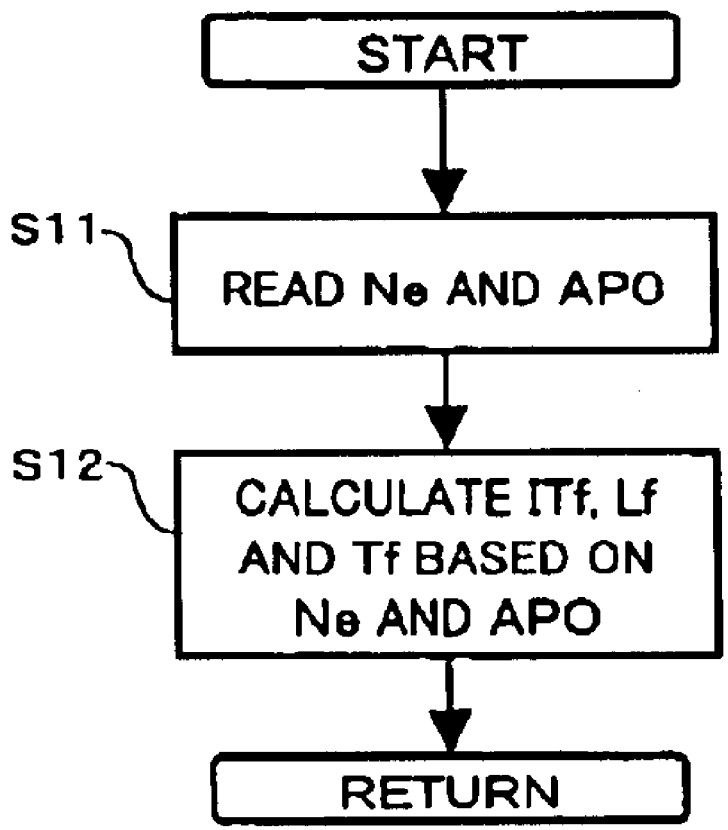
FIG. 10 is a flowchart showing a routine of control in the second embodiment.

FIG. 10 is a control flowchart showing a processing routine executed by the ECU 15 at each predetermined time (for example, 10 ms). In this routine, control values for controlling the injector 30 and fuel pressure control valve 11b are calculated.

First, at step 11, the engine rotational speed Ne and the accelerator opening APO are read from the memory in the ECU 15.

Next, at step 12, injection timing ITf, a lift amount Lf of the needle valve 30c and an opening time Tf, of the injector 30, and a target fuel pressure Pf of the fuel pressure control valve 11b, are calculated based on the engine rotational speed Ne and the accelerator opening APO. To be specific, the respective values corresponding to the current Ne and APO are looked up in a control map in which ITf, Lf, Tf and Pf are stored so as to correspond to the engine rotational speed and the accelerator opening. The respective control values calculated as described above are once stored in the memory in the ECU 15, and then used to control the injector 30 and the fuel pressure control valve 11b.

Next, setting characteristics of the respective control values calculated in the routine in FIG. 10 and a spray characteristic due to the setting characteristics will be described referring to FIG. 11 (corresponding to FIG. 5 in the first embodiment).

Figure 11:
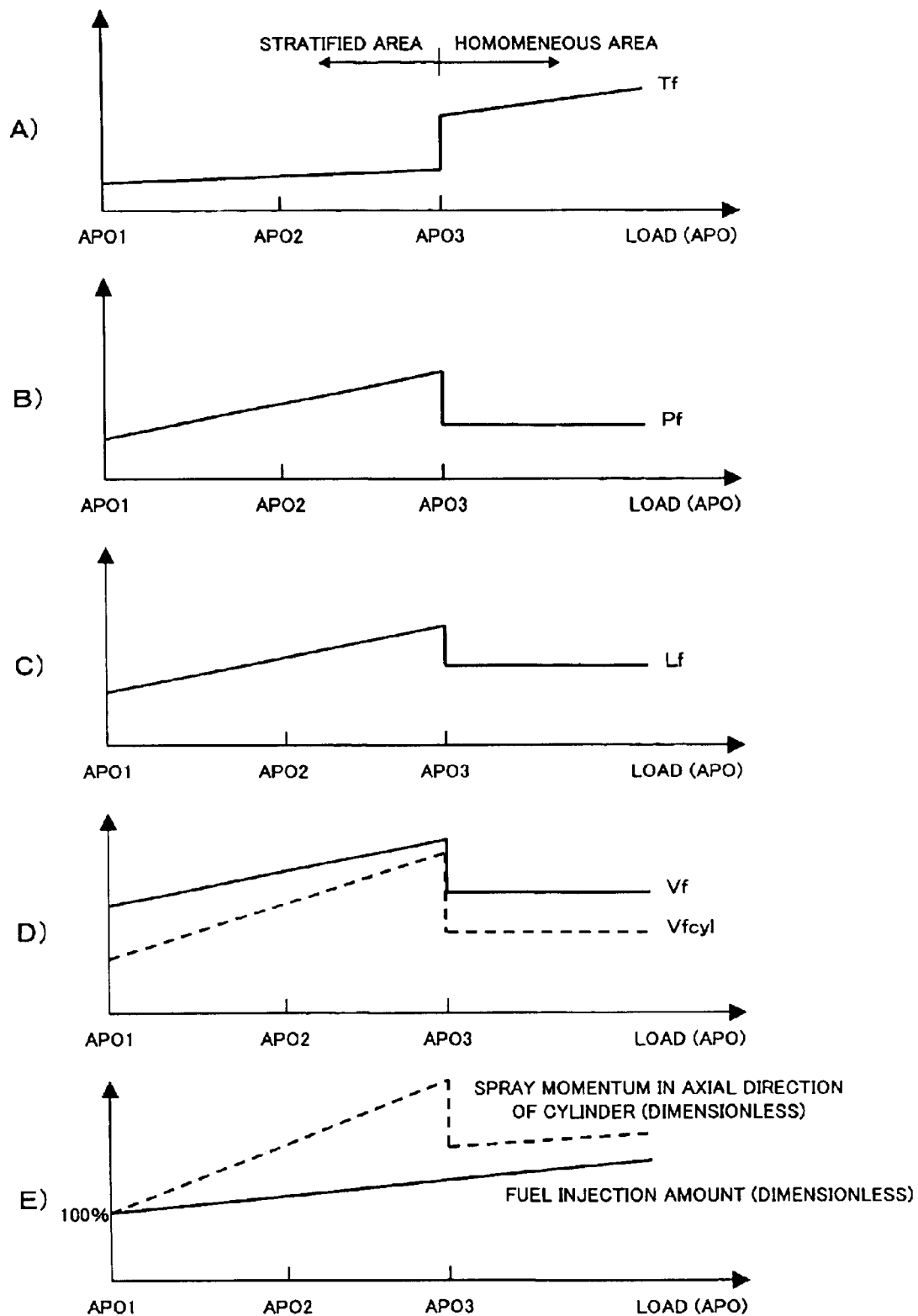
FIG. 11 is a diagram showing setting characteristics of control values and a spray characteristic in the second embodiment.

A) of FIG. 11 shows the setting of the opening time Tf of the injector 30. The opening time Tf of the injector 30 is set to slightly increase as the load increases in the stratified area, while being set to increase as the load increases in the homogeneous area.

B) of FIG. 11 shows the setting of the fuel pressure Pf in the fuel piping 12. The fuel pressure Pf is set to increase as the load increases in the stratified area, while being set to be a relatively low and constant pressure irrespective of the load in the homogeneous area.

C) of FIG. 11 shows the setting of the lift amount Lf of the needle valve 30c. The lift amount Lf is set to increase as the load increases in the stratified area, while being set to be a relatively low and constant lift amount irrespective of the load in the homogeneous area. Accordingly, the spray angle θ of the fuel spray reduces as the load increases in the stratified area, while being substantially constant in the homogeneous area.

D) of FIG. 11 shows a spray velocity (injected fuel velocity) Vf and a component Vfcyl of the spray velocity in the axial direction of the cylinder. The higher the fuel pressure Pf becomes, the higher the spray velocity Vf becomes. Accordingly, the spray velocity Vf increases as the load increases in the stratified area, while being substantially constant in the homogeneous area. If the spray velocity is divided into components in the axial direction of the cylinder and in the radial direction of the cylinder, the smaller the spray angle θ is, the larger the component in the axial direction of the cylinder becomes. Therefore, an increase rate of the component Vfcyl of the spray velocity in the axial direction of the cylinder is greater than that of the spray velocity Vf in the stratified area.

E) of FIG. 11 shows the spray momentum in the axial direction of the cylinder and the fuel injection amount (both are dimensionless values). The fuel injection amount is determined based on the opening time Tf of the injector 30, the fuel pressure Pf and the lift amount Lf, and increases as the load increases. The spray momentum in the axial direction of the cylinder is determined based on the component Vfcyl of the spray velocity in the axial direction of the cylinder and the fuel injection amount. As is apparent from this figure, an increase rate of the spray momentum in the axial direction of the cylinder is greater than that of the fuel injection amount in the stratified area.

As described above, by controlling the spray momentum in the axial direction of the cylinder according to the load, it is possible to form the stratified air-fuel mixture mass of the appropriate size under the broad engine operating condition.

Especially, according to the embodiment, the fuel injecting device can be formed of the fuel injection valve (injector 30) only, and the structure can be simplified. On the other hand, by controlling the fuel pressure Pf and also by controlling the spray angle θ by using the lift amount Lf, the spray momentum in the axial direction of the cylinder can reliably be controlled according to the load.

It is also possible that the increase rate of the spray momentum in the axial direction of the cylinder is made greater than that of the fuel injection amount by increasing the fuel pressure Pf only or the lift amount Lf only, according to the load.

INDUSTRIAL APPLICABILITY

As described above, according to the invention, the stratified air-fuel mixture of the appropriate air-fuel ratio can be formed under the broad load condition, and the area of the stratified combustion operation can be broadened. Consequently, the present invention has a wide range of industrial applications.

What is claimed is:

1. A stratified air-fuel mixture forming apparatus for an internal combustion engine in which a spark plug is disposed substantially at the center of an upper portion of a combustion chamber, comprising:

a fuel injecting device which forms a fuel spray moving toward a piston reciprocating in a cylinder; and a control device which controls the momentum of the fuel spray according to a fuel injection amount so that an increase rate of the momentum of the fuel spray in an axial direction of the cylinder is greater than that of the fuel injection amount.

2. A stratified air-fuel mixture forming apparatus for an internal combustion engine according to claim 1, wherein the fuel injecting device forms the fuel spray in a shape symmetric with respect to a cylinder axis.

3. A stratified air-fuel mixture forming apparatus for an internal combustion engine according to claim 1, wherein the fuel injecting device includes a gas injection valve injecting gas toward the piston, and forms the injected gas and fuel into the fuel spray.

4. A stratified air-fuel mixture forming apparatus for an internal combustion engine according to claim 3, wherein the control device controls a gas injection amount of the gas injection valve according to the fuel injection amount.

5. A stratified air-fuel mixture forming apparatus for an internal combustion engine according to claim 4, wherein the control device controls the gas injection valve so that a ratio of the gas injection amount to the fuel injection amount increases as the fuel injection amount increases.

6. A stratified air-fuel mixture forming apparatus for an internal combustion engine according to claim 3, further comprising;

a gas pressure regulator regulating a pressure of the gas supplied to the fuel injecting device, wherein the control device controls the gas pressure regulator according to the fuel injection amount.

7. A stratified air-fuel mixture forming apparatus for an internal combustion engine according to claim 6, wherein the control device controls the gas pressure regulator so that the gas pressure increases as the fuel injection amount increases.

8. A stratified air-fuel mixture forming apparatus for an internal combustion engine according to claim 1, further comprising;

a fuel pressure regulator regulating a pressure of the fuel supplied to the fuel injecting device, wherein the fuel injecting device includes a fuel injection valve injecting fuel a pressure of which has been regulated by the fuel pressure regulator toward the piston and the control device controls the fuel pressure regulator according to the fuel injection amount.

9. A stratified air-fuel mixture forming apparatus for an internal combustion engine according to claim 8, wherein the control device controls the fuel pressure regulator so that the fuel pressure increases as the fuel injection amount increases.

10. A stratified air-fuel mixture forming apparatus for an internal combustion engine according to claim 1, wherein the fuel injecting device includes a fuel injection valve which can change a spray angle and injects fuel toward the piston and the control device controls the spray angle of the fuel injection valve according to the fuel injection amount.

11. A stratified air-fuel mixture forming apparatus for an internal combustion engine according to claim 10, wherein the control device controls the fuel injection valve so that the spray angle reduces as the fuel injection amount increases.

12. A stratified air-fuel mixture forming method for an internal combustion engine in which a spark plug is disposed substantially at the center of an upper portion of a combustion chamber, comprising:

forming a fuel spray moving toward a piston reciprocating in a cylinder; and controlling the momentum of the fuel spray according to a fuel injection amount so that an increase rate of the momentum of the fuel spray in an axial direction of the cylinder is greater than that of the fuel injection amount.

13. A stratified air-fuel mixture forming apparatus for an internal combustion engine according to claim 2, wherein the fuel injecting device includes a gas injection valve injecting gas toward the piston, and forms the injected gas and fuel into the fuel spray.

14. A stratified air-fuel mixture forming apparatus for an internal combustion engine according to claim 2, further comprising;

a fuel pressure regulator regulating a pressure of the fuel supplied to the fuel injecting device, wherein the fuel injecting device includes a fuel injection valve injecting fuel a pressure of which has been regulated by the fuel pressure regulator toward the piston and the control device controls the fuel pressure regulator according to the fuel injection amount.

15. A stratified air-fuel mixture forming apparatus for an internal combustion engine according to claim 2, wherein the fuel injecting device includes a fuel injection valve which can change a spray angle and injects fuel toward the piston and the control device controls the spray angle of the fuel injection valve according to the fuel injection amount.

* * * * *